July 24, 1951  E. C. OLIVER  2,562,058
COMMODE
Filed May 28, 1948  2 Sheets-Sheet 1

Eugene C. Oliver
INVENTOR.

BY *[signatures]*
Attorneys

July 24, 1951 E. C. OLIVER 2,562,058
COMMODE
Filed May 28, 1948 2 Sheets-Sheet 2

Eugene C. Oliver
INVENTOR.

Patented July 24, 1951

2,562,058

UNITED STATES PATENT OFFICE 2,562,058

COMMODE

Eugene C. Oliver, Independence, Iowa

Application May 28, 1948, Serial No. 29,819

4 Claims. (Cl. 4—114)

This invention relates to automobile equipment and particularly to a commode installed in the floor of a vehicle that will take care of the personal needs of a passenger and especially children, eliminating the necessity for stopping at inconvenient times and places during a trip.

The primary object of the invention is to provide a device of this character that is adapted to be readily put into use and, when no longer needed, may be removed from view, thereby consuming no unnecessary space in the vehicle.

Another object of the invention is to provide a support for the commode directly on the housing therefor, both when the device is inactive and when it is in use.

Another object of the invention is to provide means to retain the commode closed at all times, the closure means being the means whereby the device is transported, as well as to provide means to prevent movement thereof, while retained in the housing.

And another object of the invention is to provide a device that is simple and inexpensive to manufacture, is readily installed, durable in construction, and efficient for the intended purpose.

Other objects of the invention reside in the details of construction and in the combination of the various parts and in their mode of operation as will hereinafter appear.

The following is a detailed description of a preferred embodiment of the invention and is illustrated in the accompanying drawings, wherein.

Frequently, in long trips in motor vehicles, it becomes necessary for the passengers to take care of their personal needs. This is particularly true where small children are involved, and it is often inconvenient or impossible to stop and do so. The instant invention has been devised to overcome these difficulties and is adapted to be readily installed in any type of vehicle, wherever it is desired.

Figure 1:
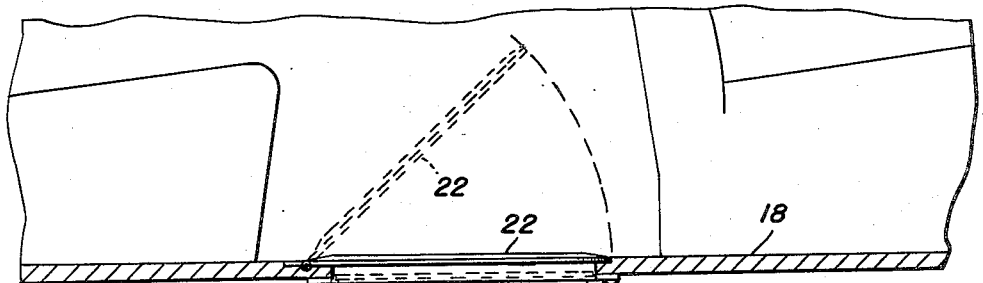
Figure 1 is a view of the invention as installed on the floor of an automobile.
Figure 2:
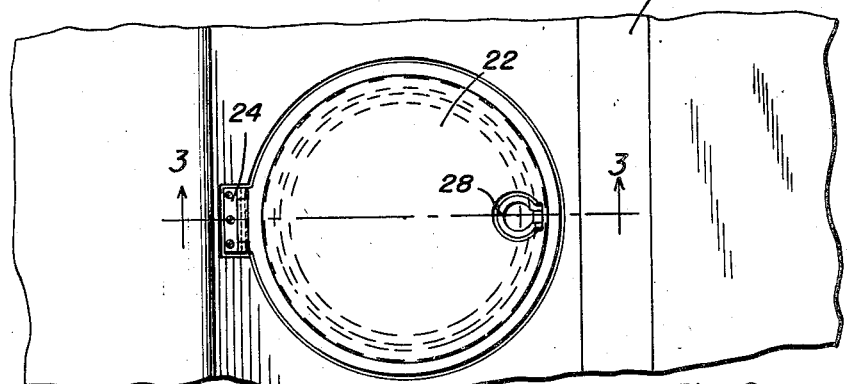
Figure 2 is a top plan view of the device shown in Figure 1.

Referring to the figures, the invention is indicated generally by the numeral 10 and consists of a housing 12 and a commode 14. Housing 12 includes an annular flange 16, whereby it is secured beneath the floor 18 of a motor vehicle, as by retaining screws 20. While the invention may be mounted in any desired location, it is generally preferred that it be placed between the front and rear seats, in the event that it is used in a passenger automobile, or between any adjacent seats in a bus or the like. Of course, floor 18 will be opened where toilet 10 is secured and retains a cover 22 thereover, cover 22 being pivotally secured at 24 at one end thereof and being received in a suitable recess or depression 26 at the opposite end thereof. A tab 28 is secured to cover 22 to permit ready and rapid actuation of cover 22, in the manner indicated in dotted lines in Figure 1, when the commode is to be used.

Housing 12 is approximately as wide as the opening in the floor of the vehicle and is of a length sufficient to accommodate commode 14 therein, whereby the commode is capable of disappearing from view when not in use. Housing 12 is of annular construction, although it is to be understood that any other type may be employed, and includes a plurality of pairs of vertically extending guide flanges or bars 30, the pairs of bars 30 forming a commode guide and retaining channel 32 therebetween, as will presently become clearer. It will be noted that in the instant modification, a total of four channels 32 are provided, although any number may be supplied as desired. As is more clearly shown in Figures 1, 3 and 4, guide bars 30 are generally of S-shape and include parallel vertical legs 34 and 36. Legs 34 and 36 are offset from each other and are joined by transverse connecting members 38 and 40. Legs 38 and 40 are not similar in construction, leg 38 being merely a straight connecting leg while leg 40 contains a U-shaped depression or seat 42 adjacent leg 34, for a purpose presently to appear. Leaf springs 46 are secured, as by bolts or the like 48, to opposite sides of housing 12 and serve to retain commode 14 in immovable position and prevent rattling thereof while the vehicle is in motion.

Figure 5:
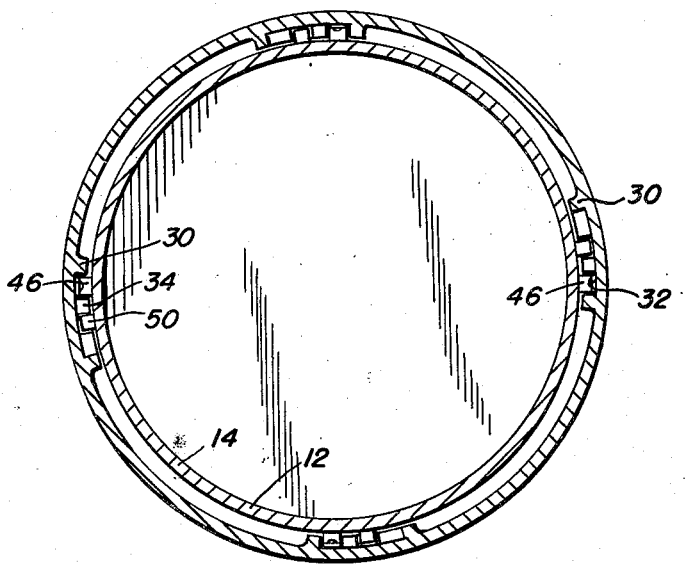
Figure 5 is a sectional view of the device illustrated in Figure 4, and is taken substantially on lines 5—5 of Figure 4.

As is apparent from Figure 5, commode 14 is also of annular shape, and is of smaller diameter than housing 12. Lugs 50 are integrally secured to commode or chamber 14 approximately medially the vertical length thereof and the number of lugs employed conforms to the number of channels 32. As is readily apparent, lugs 50 are of sufficient width to freely slide within channels 32 to be retained therein between guide bars 30. When chamber 14 is inserted, it follows the space defined by the S-shape of guide bars 30, somewhat in the manner of a bayonet slot, until it has been secured in the position illustrated in Figure 3. A commode cover 52 fits snugly on rim 54 and is retained in closed position by leaf springs 56 secured to cover 52. Springs 56 are of sufficient strength and size to retain the lid or cover 52 on commode 14, thereby enabling it to be transported, as by handle 58, when desired.

Figure 3:
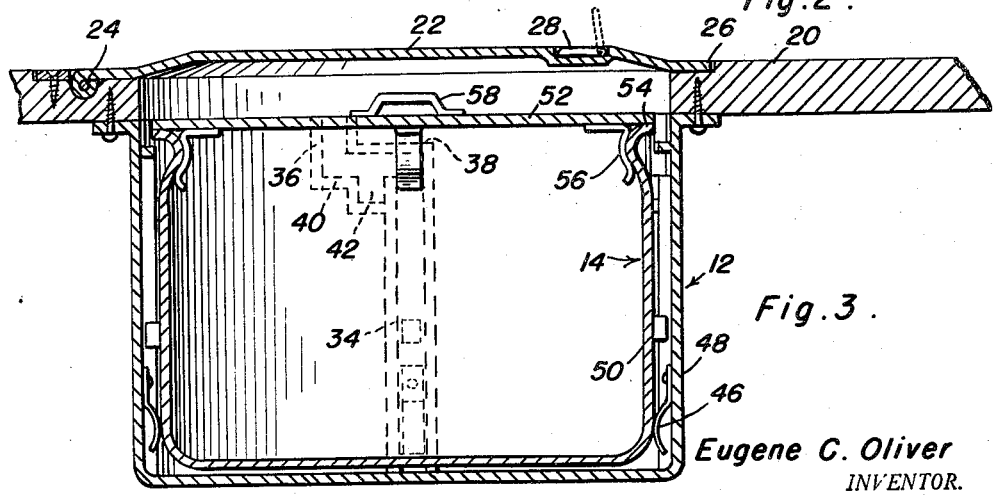
Figure 3 is a vertical sectional view of the invention and is taken substantially on lines 3—3 of Figure 2.
Figure 4:
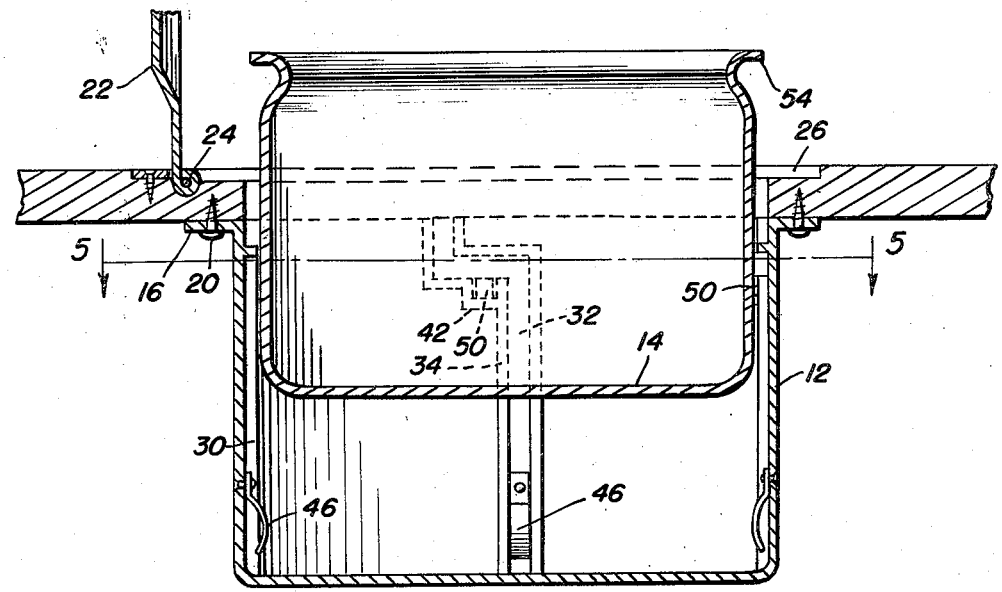
Figure 4 is a view similar to Figure 3 disclosing the commode in use.

When commode 14 is to be placed in position within housing 12, cover 22 is raised and lugs 50 slidably moved in channels 32, being turned laterally a portion of the length thereof to assume the position illustrated in Figure 3. Leaf springs 46 of housing 12 prevent chamber 14 from moving about when the vehicle is in motion. Cover 52 is then replaced. When the device is to be used, cover 22 is again pivoted into open position and commode 14 is raised by means of handle 58. However, it is not removed from housing 12 but is seated in seat 42, in the manner illustrated in Figure 4 by means of lugs 50. It is now in position for use, after which it may again be returned to the original position, or removed entirely from housing 12 for disposal of the contents. While it is not being employed for the intended purpose, cover 22 is closed and the floor of the vehicle is used in a normal manner.

Of course, any suitable material may be employed as may be found expedient, and the manner in which the housing or the chamber is supported may be varied within the scope of the invention.

Thus, while one complete embodiment has been described in detail, it is to be understood that various features of the invention may be independently used and also that numerous modifications might be made by those skilled in the art, without departure from the spirit and scope of the invention, as indicated above and in the following claims.

Having described the invention, what is claimed as new is:

1. In a vehicle having a floor with a circular opening therethrough, a toilet article comprising a housing secured to the floor and having a cylindrical wall in alignment with the opening, a pair of spaced, vertically disposed guide bars secured in said housing defining a channel therebetween, a cylindrical commode disposed in said housing and having a lateral lug slidably received in said guide channel, said guide bars including upper and lower ends with an intermediate substantially horizontal section interconnecting the adjacent vertical sections, and a U-shaped notch in the horizontal section of the lower guide bar adapted to receive said lateral lug and support said commode in elevated position during use.

2. The combination of claim 1 and a cover hinged to said floor and adapted to close the opening provided in the floor.

3. The combination of claim 1, wherein said commode includes a rim, a lid seated on said rim, and tension means secured to said lid and retained on said rim for closing the commode.

4. The combination of claim 1 and arcuate leaf springs carried in said housing adjacent the lower end thereof and adapted to abut the sides of said commode.

EUGENE C. OLIVER.

REFERENCES CITED

The following references are of record in the file of this patent:

UNITED STATES PATENTS

| Number | Name | Date |
|---|---|---|
| 124,725 | Davis | Mar. 19, 1872 |
| 1,359,544 | Stiles | Nov. 23, 1920 |
| 1,445,457 | Simon | Feb. 13, 1923 |
| 1,954,568 | Kenny | Apr. 10, 1934 |
| 2,050,909 | Woodall | Aug. 11, 1936 |
| 2,133,789 | Pool | Oct. 18, 1938 |
| 2,337,331 | Kirschner | Dec. 21, 1943 |
| 2,447,429 | Procter | Aug. 17, 1948 |